(12) United States Patent
Lehmann et al.

(10) Patent No.: US 9,375,983 B2
(45) Date of Patent: Jun. 28, 2016

(54) APPARATUS FOR DISPLAYING A TIRE PRESSURE STATE FOR VEHICLE TIRES OF A TRUCK TRAILER

(71) Applicant: Continental Reifen Deutschland GmbH, Hannover (DE)

(72) Inventors: Joerg Lehmann, Hannover (DE); Bernd Lange, Bueckeburg (DE); Thomas Roesch, Mintraching (DE)

(73) Assignee: Continental Reifen Deutschland GmbH, Hannover (DE)

( * ) Notice: Subject to any disclaimer, the term of this patent is extended or adjusted under 35 U.S.C. 154(b) by 86 days.

(21) Appl. No.: 14/320,028

(22) Filed: Jun. 30, 2014

(65) Prior Publication Data

US 2014/0313753 A1    Oct. 23, 2014

Related U.S. Application Data

(63) Continuation of application No. PCT/EP2012/075330, filed on Dec. 13, 2012.

(30) Foreign Application Priority Data

Jan. 3, 2012 (DE) .................. 10 2012 100 024

(51) Int. Cl.
*B60Q 1/00* (2006.01)
*B60C 23/02* (2006.01)
*B60C 23/00* (2006.01)
*B60C 23/04* (2006.01)
*B60Q 1/26* (2006.01)

(Continued)

(52) U.S. Cl.
CPC ............. *B60C 23/02* (2013.01); *B60C 23/009* (2013.01); *B60C 23/0406* (2013.01); *B60Q 1/2657* (2013.01); *B60Q 1/50* (2013.01); *F21V 21/14* (2013.01)

(58) Field of Classification Search
CPC .... F21V 21/14; B60C 23/009; B60C 23/0406
See application file for complete search history.

(56) References Cited

U.S. PATENT DOCUMENTS 3,680,523 A * 8/1972 Gaskins .............. B60C 23/0496
116/34 R (Continued)

FOREIGN PATENT DOCUMENTS

DE    10 2009 003 460 A1    8/2010
EP    1 510 401 A2    3/2005

OTHER PUBLICATIONS

International Search Report dated Feb. 7, 2013 of international application PCT/EP2012/075330 on which this application is based.

*Primary Examiner* — Andrew Coughlin
(74) *Attorney, Agent, or Firm* — Walter Ottesen, P.A.

(57) ABSTRACT

An apparatus for displaying the state of the tire pressure for a vehicle tire of a truck trailer includes a lamp to optically display the tire pressure state. An arm is provided with the lamp arranged thereon. A mount fixes the arm to the truck trailer and the arm is made substantially of an elastomer material so as to cause the arm to be flexibly deformable when colliding with a foreign object. The arm reverts back to its initial configuration after such a collision as a result of its elastic material characteristic.

17 Claims, 2 Drawing Sheets

(51) Int. Cl.
    *B60Q 1/50*    (2006.01)
    *F21V 21/14*   (2006.01)

(56)             References Cited

U.S. PATENT DOCUMENTS 3,938,078  A  *   2/1976   Davis .................. B60C 23/0496
                                                              200/61.25
    4,065,750  A      12/1977  Duncan et al.
    4,131,876  A      12/1978  Dees, Sr. et al.
    5,327,116  A  *   7/1994   Davidson ................ B60C 23/08
                                                              116/34 R
    2004/0094251 A1   5/2004   Strache et al.
    2007/0018804 A1   1/2007   Strache et al.
    2013/0306192 A1*  11/2013  Hennig .................. B60C 23/003
                                                              141/4

* cited by examiner

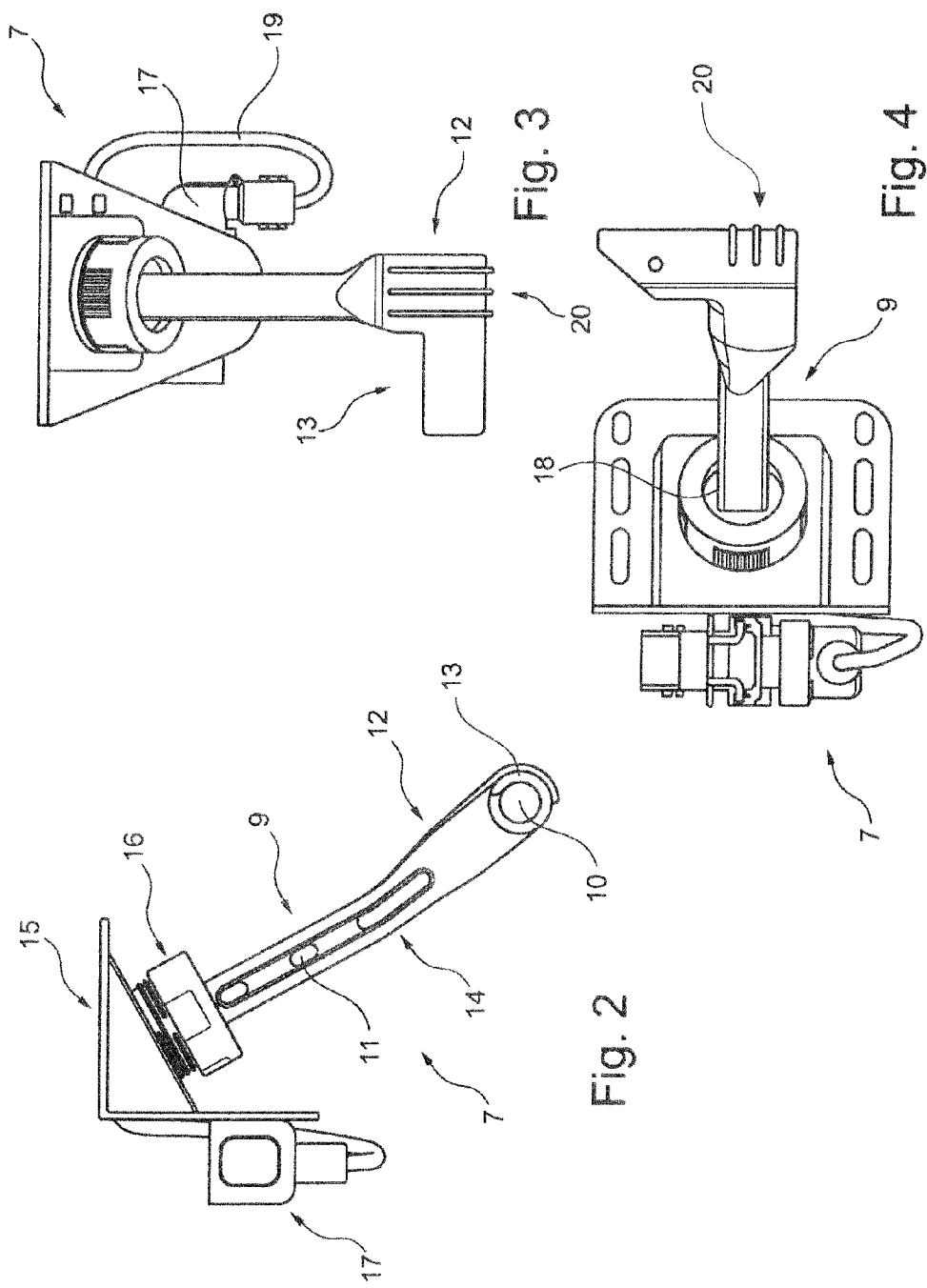

APPARATUS FOR DISPLAYING A TIRE PRESSURE STATE FOR VEHICLE TIRES OF A TRUCK TRAILER

CROSS REFERENCE TO RELATED APPLICATIONS

This application is a continuation application of international patent application PCT/EP2012/075330, filed Dec. 13, 2012, designating the United States and claiming priority from German application 10 2012 100 024.7, filed Jan. 3, 2012, and the entire content of both applications is incorporated herein by reference.

FIELD OF THE INVENTION

The invention relates to an apparatus for displaying a tire pressure state for vehicle tires of a truck trailer.

BACKGROUND OF THE INVENTION

Tire modules provided with transponders are used for various tasks in tires, in particular tire sensors for truck tires. These include, in particular, tire identification with which a motor vehicle manufacturer can, inter alia, detect quickly and in an automated fashion the tire factory from which a specific tire has been obtained and on which vehicle the tire was installed. Other tasks are generally monitoring of the tire pressure, measurement of the temperature or the measurement of mechanical stress states in the tire. Modern transponders include an electronic component or chip in which sensor elements can be arranged and an antenna which is connected to this electronic component. An example of such a transponder is disclosed in United States patent applications 2004/0094251 and 2007/0018804.

A problem when monitoring the tire pressure of trucks is that in many cases the tire pressure of the vehicle tires of the truck trailer has to be monitored independently of the tractive unit. A large number of tractive units do not, for example, have a tire pressure monitoring system. Even if the tractive unit has a tire pressure monitoring system, this system may not be able to communicate with the tire pressure monitoring system of the truck trailer.

SUMMARY OF THE INVENTION

It is an object of the invention to provide an apparatus with which reliable signal transmission can occur from the truck trailer to the tractive unit.

The object of the invention is achieved by an apparatus for displaying a tire pressure state for a vehicle tire of a truck trailer. The apparatus includes: a lamp configured to display the tire pressure state optically; an arm configured to have the lamp arranged thereon; a mount configured to fix the arm on the truck trailer; the arm being made substantially of an elastomer material configured to make the arm flexibly deformable in the event of a collision with a foreign object; and, the arm being further configured to revert back to its initial configuration after the collision as a result of its elastic material characteristic.

One advantage of the invention is that reliable and autonomous transmission of signals can occur from the truck trailer to the tractive unit with the apparatus. The apparatus has an optimum design in order to convey the warning signal from the truck trailer to the tractive unit. A further significant advantage is that in the event of a collision with a foreign object the arm can deform flexibly by virtue of the material properties of the arm, and the warning lamp is as a result not damaged. Such collisions can occur, for example, if a lateral loading gate on the truck trailer drops down and collides with the warning lamp. Furthermore, the warning lamp can collide with a loading ramp if the truck trailer is correspondingly positioned during unloading. The warning lamp is constructed overall in such a way that even at high vehicle speeds of the truck no significant deformations occur on the arm of the warning lamp.

In one advantageous embodiment, it is provided that the arm has an I profile with cutouts, wherein the flexibility of the arm is influenced in a targeted manner by the cutouts. This type of configuration of the arm of the warning lamp ensures that there is sufficient flexibility. On the other hand, the arm has a high level of flexural rigidity.

A further advantageous embodiment provides that the arm has a bend in the range between 5° and 15° in the central region.

As a result of this bend, an optimum introduction of force is ensured in the event of a collision with a foreign object.

A further advantageous embodiment provides that the lamp is surrounded at the end of the arm in an enclosed lamp housing, wherein the lamp housing and the arm are embodied in one piece. This makes it easier to orient the warning lamp in the direction of the outside rearview mirror.

A further advantageous embodiment provides that the lamp has a lateral anti-glare protection for avoiding scattered light. The occurrence of scattered light would under certain circumstances confuse the oncoming traffic.

A further advantageous embodiment provides that the lamp housing has on its outer side an anti-wear protection in the form of ribs. The ribs provide additional protection for the lamp housing. This protection is, for example, effective in the event of a collision of the lamp with a loading ramp.

A further advantageous embodiment provides that the arm has at the lower end an adjustment unit with which the lamp is oriented after the installation of the mount on the truck trailer. In this manner, the lamp can easily be oriented in order to ensure reliable transmission of signals.

A further advantageous embodiment provides that the adjustment unit includes a ball-and-socket joint, wherein, after the orientation of the lamp, the ball-and-socket joint is secured to the mount with a screwable clamping device.

The use of a ball-and-socket joint permits a precise setting of the warning lamp to be implemented.

A further advantageous embodiment provides that the mount has a bent profile in the side view. As a result, the warning lamp can easily be installed on the truck trailer.

A further advantageous embodiment provides that an electric plug is arranged on the mount, wherein the plug is connected to the lamp via an electrical line.

With the plug, the warning lamp can easily be connected to the central receiver unit of the truck trailer.

BRIEF DESCRIPTION OF THE DRAWINGS

The invention will now be described with reference to the drawings wherein:

FIG. 2 shows the warning lamp in a view from the front;

FIG. 3 shows the warning lamp in a side view; and,

FIG. 4 shows the warning lamp in a plan view.

DESCRIPTION OF THE PREFERRED EMBODIMENTS OF THE INVENTION

Figure 1:
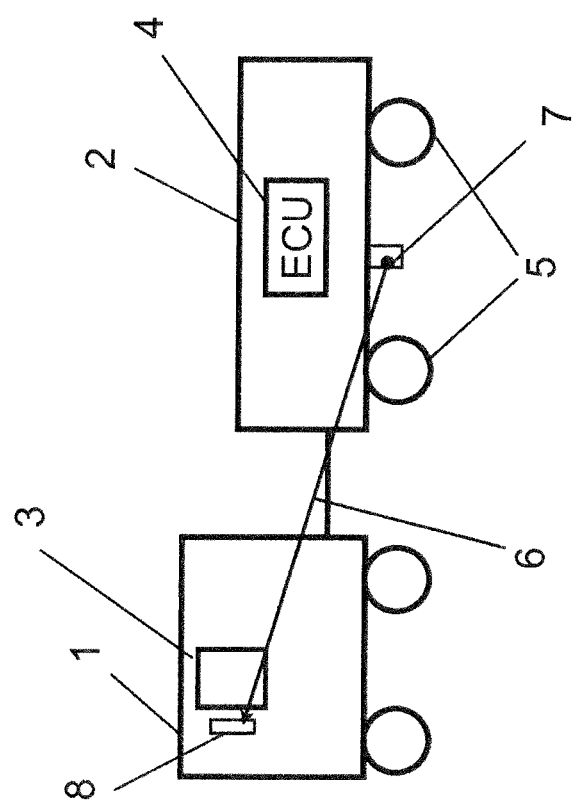
FIG. 1 is a schematic of a truck tractive unit with a truck trailer.

FIG. 1 shows a truck with a tractive unit 1 and a truck trailer 2. The truck trailer 2 has a plurality of vehicle tires 5 in each of which tire pressure modules are arranged. The tire pressure can be monitored via the tire pressure modules. The individual tire modules of the vehicle tires 5 are connected, for example, via a radio link to the central receiver unit 4, which is, in turn, arranged on the truck trailer 2. If one of the vehicle tires 5 has an excessively low pressure which deviates from the predefined setpoint value by approximately 10 to 20%, a corresponding warning signal is registered by the receiver unit 4.

The receiver unit 4 at the same time detects the faulty wheel position of the vehicle tire with the unwanted low pressure. The warning lamp unit 7 is arranged on the side of the truck trailer 2 and is connected via a data line or a radio link to the receiver unit 4. If a general warning state is present, the warning lamp unit 7 is correspondingly activated by the receiver unit 4. In the traveling state of the truck, a signal is then projected to the exterior rear view mirror 8 of the tractive unit. This signal informs the driver of the truck about a general warning state which indicates an unwanted low pressure of a vehicle tire on the truck trailer. In the subsequent scenario, the driver of the truck would stop at the next possibility and check the vehicle tires of the truck trailer.

The lamp beam 6 of the warning lamp unit 7 is focused and directed onto the side mirror or exterior rearview mirror 8 of the tractive unit 1.

FIG. 2 shows the warning lamp unit 7 in a view from the front. The warning lamp unit 7 includes the arm 9 of the warning lamp unit, the mount 15 and the lamp 10. The lamp 10 is arranged in a lamp housing 12 with an anti-glare protection 13. In the case of a too low tire pressure at one of the vehicle tires, the lamp 10 is activated and a corresponding warning signal is outputted. This warning signal is directed to the exterior rear view mirror of the tractive unit. The arm 9 has an I-shaped profile with cutouts 11. Furthermore, approximately in the center of the arm 9, there is a bend 14 with an angle in the range between 5° and 15°. This bend ensures optimum introduction of force in the event that a foreign object collides laterally with the warning lamp 9. The lamp 10 is oriented with the screwable clamping device 16. A ball-and-socket joint, which is connected to the arm 9, is arranged under the clamping device 16. The ball-and-socket joint bears on the opposite side in a corresponding ball socket in the mount 15. As a result, the arm 9 can be reliably secured in any position. The mount 15 has an angular profile on which a plug 17 is arranged laterally. The warning lamp unit 7 is installed on the side of the truck trailer via the mount 15.

FIG. 3 shows a side view of the warning lamp unit 7. Three ribs 20, which serve as anti-wear protection, are arranged on the outside of the lamp housing 12. The cable 19 connects the lamp 10 to the plug 17.

FIG. 4 shows a plan view of the warning lamp unit 7. The ball-and-socket joint 18 is arranged at the lower end of the arm 9.

It is understood that the foregoing description is that of the preferred embodiments of the invention and that various changes and modifications may be made thereto without departing from the spirit and scope of the invention as defined in the appended claims.

LIST OF REFERENCE NUMERALS

1 Tractive unit
2 Truck trailer
3 Side window on driver's side
4 Receiver unit on truck trailer
5 Vehicle tire on truck trailer
6 Light signal
7 Warning lamp or unit for displaying the tire pressure state
8 Exterior rearview mirror on the tractive unit
9 Arm of the warning light
10 Lamp
11 Cutouts
12 Lamp housing
13 Anti-glare protection
14 Bend
15 Mount
16 Screwable clamping device
17 Plug
18 Ball-and-socket joint
19 Electrical line/cable
20 Ribs

What is claimed is:

1. An apparatus for displaying a tire pressure state for a vehicle tire of a truck trailer, the apparatus comprising:
a lamp configured to display the tire pressure state optically;
an arm configured to have said lamp arranged thereon;
a mount configured to fix said arm on the truck trailer;
said arm being made substantially of an elastomer material configured to make said arm flexibly deformable in the event of a collision with a foreign object;
said arm being further configured to revert back to its initial configuration after said collision as a result of its elastic material characteristic;
said arm having a lower end and an adjusting device disposed at said lower end;
said adjusting device being configured to adjust an alignment of said arm after said mount is fixed on the truck trailer;
said adjusting device including a ball joint;
a threadably engageable clamping mechanism; and,
said clamping mechanism being configured to fix said ball joint on said mount after the alignment of said lamp has been adjusted.

2. The apparatus of claim 1, wherein said arm has an I-profile with cutouts configured to influence the flexibility of said arm in a targeted manner.

3. The apparatus of claim 1, wherein said arm has a central region and a bend disposed in said central region; and, said bend defining an angle lying in a range of 5° to 15°.

4. The apparatus of claim 1, further comprising:
a closed lamp housing;
said arm having a first end;
said lamp being arranged in said lamp housing; and,
said lamp housing being arranged at said first end of said arm and being configured as a one-piece component with said arm.

5. The apparatus of claim 1, wherein said lamp includes a lateral glare protection configured to avoid scattered light.

6. The apparatus of claim 1, further comprising a lamp housing having an exterior and at least one rib configured as wear protection arranged on said exterior of said lamp housing.

7. The apparatus of claim 1, wherein said mount has an angled profile when viewed laterally.

8. The apparatus of claim 1 further comprising:
an electric plug arranged on said mount; and,
an electrical line connecting said lamp to said electric plug.

9. An apparatus for displaying a tire pressure state for a vehicle tire of a truck trailer, the apparatus comprising:
a lamp configured to display the tire pressure state optically;
an arm configured to have said lamp arranged thereon;
a mount configured to fix said arm on the truck trailer;

said arm being made substantially of an elastomer material configured to make said arm flexibly deformable in the event of a collision with a foreign object;

said arm being further configured to revert back to its initial configuration after said collision as a result of its elastic material characteristic;

said arm having a lower end and an adjusting device disposed at said lower end; and, said adjusting device being configured to adjust an alignment of said arm at a position at which the lamp is focused and a light beam is directed onto an exterior rear view mirror of a tractive unit to reliably transmit a signal after said mount is fixed on the truck trailer.

10. The apparatus of claim 9, wherein said arm has an I-profile with cutouts configured to influence the flexibility of said arm in a targeted manner.

11. The apparatus of claim 9, wherein said arm has a central region and a bend disposed in said central region; and, said bend defining an angle lying in a range of 5° to 15°.

12. The apparatus of claim 9, further comprising:
a closed lamp housing;
said arm having a first end;
said lamp being arranged in said lamp housing; and,
said lamp housing being arranged at said first end of said arm and being configured as a one-piece component with said arm.

13. The apparatus of claim 9, wherein said lamp includes a lateral glare protection configured to avoid scattered light.

14. The apparatus of claim 9, further comprising a lamp housing having an exterior and at least one rib configured as wear protection arranged on said exterior of said lamp housing.

15. The apparatus of claim 9, further comprising:
a threadably engageable clamping mechanism;
said adjusting device including a ball joint; and,
said clamping mechanism being configured to fix said ball joint on said mount after the alignment of said lamp has been adjusted.

16. The apparatus of claim 9, wherein said mount has an angled profile when viewed laterally.

17. The apparatus of claim 9, further comprising:
an electric plug arranged on said mount; and,
an electrical line connecting said lamp to said electric plug.

* * * * *